United States Patent [19]

Pole

[11] Patent Number: 5,130,191

[45] Date of Patent: Jul. 14, 1992

[54] FOAMED SEALANT COMPOSITION FOR USE IN MINE STOPPINGS AND THE CONSOLIDATION OF OTHER GEOLOGICAL FORMATIONS

[75] Inventor: Ernest G. Pole, Clearwater, Canada

[73] Assignee: BASF Corporation, Parsippany, N.J.

[21] Appl. No.: 618,681

[22] Filed: Nov. 27, 1990

[51] Int. Cl.$^5$ ............ B32B 27/32; C08J 9/28; C08J 9/30

[52] U.S. Cl. .................. 428/332; 428/521; 521/71

[58] Field of Search ............ 521/71; 428/332, 521

[56] References Cited

U.S. PATENT DOCUMENTS

| | | | |
|---|---|---|---|
| 2,706,183 | 4/1955 | Carter | 521/71 |
| 2,776,330 | 1/1957 | Jones et al. | 521/71 |
| 2,801,274 | 7/1957 | Bethe | 521/71 |
| 3,164,466 | 1/1965 | Pezzuto et al. | 521/71 |
| 3,228,905 | 1/1966 | Talalay et al. | 521/71 |
| 3,737,399 | 6/1973 | Locke et al. | 521/71 |
| 3,904,558 | 9/1975 | Graham et al. | 521/71 |
| 4,475,847 | 10/1984 | Cornely et al. | |
| 4,501,825 | 2/1985 | Magyar et al. | 521/71 |
| 4,607,066 | 8/1986 | Barry et al. | |

FOREIGN PATENT DOCUMENTS 982661 4/1962 United Kingdom .

*Primary Examiner*—Morton Foelak
*Attorney, Agent, or Firm*—Michael R. Chipaloski

[57] ABSTRACT

A gas barrier film-surfaced foamed sealant composition, especially useful for application to mine stoppings and other geological formations, is derived from a foamed sealant-forming medium comprising an aqueous elastomeric latex binder such as a styrene-butadiene rubber (SBR) latex, a particulate filler such as clay, a gelling agent such as ammonium sulfamate and a gaseous foaming agent such as air dispersed therein. The foamed sealant possesses a gas-impervious barrier film or coating on its exposed surface, e.g., one obtained from the aforesaid sealant-forming composition but which has not been foamed or frothed.

8 Claims, No Drawings

FOAMED SEALANT COMPOSITION FOR USE IN MINE STOPPINGS AND THE CONSOLIDATION OF OTHER GEOLOGICAL FORMATIONS

BACKGROUND OF THE INVENTION

1. Field of the Invention

This invention relates to a foamed sealant composition and, more particularly, to such a composition which is especially useful for application to mine stoppings and other geological formations.

2. Description of the Prior Art

Sealants are often used to reduce or prevent the leakage of air and other gases through porous rock formations and structures. For example, in mining applications, sealants are commonly employed to consolidate and seal porous or cracked rock and broken strata to prevent the leakage of gas, such as methane gas, which if allowed to escape, would increase the risk of explosion and fire. In the same environment, sealants may be utilized to seal and minimize spalling and delamination of the ribs and roofs of mines and also to seal mine stoppings, i.e., walls constructed to close off unused tunnels. Stoppings are often installed in mines to direct air flow and control ventilation of the mine. Conventional stoppings constructed of concrete blocks and cement or sand bags, and the like, typically are not airtight. Therefore, sealants are employed to reduce or prevent air leakage through the stoppings which would otherwise interfere with the desired ventilation.

Sealants for the above-discussed purposes are disclosed, for example, in U.S. Pat. No. 4,607,066. These sealants contain various inorganic aggregates, including glass fibers, together with a cement. The sealant disclosed in U.S. Pat. No. 4,607,066 is described as a highly thixotropic composition comprising a water-soluble or water-dispersible polymeric binder, a filler material which is preferably inorganic and water. The binding agent is described as a dispersion of any polymer or copolymer which will dry to form a water-insoluble film such as polyethylene polymer, polystyrene polymer, polyacrylic polymer and polyvinyl acetate polymer having an average molecular weight of from about 10,000 to 10,000,000. The polymeric binder is combined with inert pigments or fillers.

Other sealants useful in mine applications are disclosed, for example, in British Patent No. 982,661 and U.S. Pat. No. 4,475,847. The sealants of British Patent No. 982,661 are described as fluid compositions comprising a natural or synthetic rubber such as polychloroprene, a latex or dispersion or a mixture of such latices and/or dispersions and a filler material. The sealants of U.S. Pat. No. 4,476,847 are described as comprised of polyisocyanate/polyol blends and a foaming agent whereby upon application of the sealant composition, consolidation and sealing of the geological formation is provided by means of the foaming and hardening of the polyisocyanate/polyol blend.

SUMMARY OF THE INVENTION

The present invention provides an improved sealing composition which is especially well suited for use in mining operations, e.g., to prevent or minimize spalling or to fill cracks and voids in mine stoppings.

The sealant composition of this invention is characterized by a high solids content, foamed structure exhibiting excellent capability for plugging and filling cracks and voids and, in a preferred embodiment, possessing a non-cellular layer on its exposed surface which imparts gas imperviousness to the sealant composition and improves certain of its mechanical properties as well, e.g., its resistance to abrasion.

Broadly described, the foamed sealant composition of this invention is derived from a sealant-forming medium comprising an aqueous elastomeric latex binder, particulate filler, gelling agent and gaseous foaming agent dispersed therein, the composition being surfaced with a gas barrier film derived from a non-porous film-forming medium comprising an aqueous elastomeric latex binder, particulate filler and gelling agent. The invention also relates to a method of coating a geological formation with the foregoing sealant composition.

DESCRIPTION OF THE PREFERRED EMBODIMENTS

The binder component of the sealant composition of this invention includes any of the aqueous elastomeric latex resins which are known to be useful in the production of elastomeric foams or cellular products. Useful elastomeric latex binders include the naturally occurring rubber latices and such synthetic latex resins as the styrene-butadiene (SBR) latices, polychloroprene latices and butadiene-acrylonitrile latices. See, in this regard, "Butadiene Polymers" in Vol. 2 and "Latices" in Vol. 8 of the "Encyclopedia of Polymer Science and Engineering", Marks et al., eds., John Wiley & Sons, 1987, the contents of which are incorporated by reference herein. Such latices often contain from about 20 to about 35 weight percent styrene copolymerized with from about 80 to about 65 weight percent butadiene, a total solids content of from about 65 to about 75 weight percent and from about 2 to about 6 weight percent of a fatty acid soap, e.g., potassium oleate, as the micelle-forming agent used in their manufacture. The BUTONAL ™ SBR latices (BASF Corporation) are typical of the commercially available products which can be used in the sealant composition of this invention with generally good results.

Suitable fillers for use herein include mica, Kaolin clays, titanium dioxide, silica, quartz, calcium carbonate, glass, feldspar, carbon black, wood flour, and the like, and mixtures thereof. Regular and irregularly shaped filler particles are contemplated. The average particle size of the filler can vary over relatively wide limits. The total amount of filler(s) employed in the sealant composition will often be in the range of from about 30 to about 66 weight percent with from 50 to about 60 weight percent being more usual. Optionally, the sealant-forming medium can contain fibrous reinforcement particles, e.g., glass fibers.

The gelling agent transforms the latex from a fluid to a uniform gel of approximately the same size and shape by destabilizing the latex. The gelling agents for use herein effect rapid destabilization of the latex, e.g., by converting the soluble carboxylate soap which maintains the stability of the latex to an insoluble material which precipitates from solution. Among the gelling agents which can be used herein with generally good results are zinc ammine systems such as those described in Blackley, "High Polymer Latices", Vol. 1, pp. 35 et sec. (1966). Such systems include a source of zinc ions, free ammonia and ammonium ions, the latex itself being stabilized with an adsorbed anion which is capable of forming an insoluble zinc soap, e.g., a fatty acid carboxylate anion such as oleate anion. Another useful gelling system is that described in U.S. Pat. No. 4,240,860. Such gelling system is composed of an ammonium or amine salt gelling agent, a zinc or cadmium ion donor compound and ammonia or an ammonia donor compound. The system ultimately combines with the latex-stabilizing agent, e.g., oleate soap, to form a destabilizing metal soap. The ammonium or amine salt gelling agent can include ammonium sulfate, formate, chloride, carbonate, nitrate, acetate, polyphosphate, sulfamate and the lower alkyl, alkylene and alkanolamine sulfamates. Should a relatively rapid-acting gelling system be selected, e.g., one based on ammonium acetate which tends to gel in minutes or at most a few hours, the system should be added to the filled latex composition shortly before use. However, less reactive gelling systems such as those based on the ammonium and amine sulfamates are generally preferred since they provide longer storage life or pot life ad therefore allow the sealant composition of this invention to be prepared as a single package some time in advance of its use, e.g., several days or even weeks, a significant practical advantage over the more reactive gelling agents. Amounts of gelling agent can vary over fairly wide limits depending upon the gelling system being used and the latex compound being used.

The sealant-forming medium can also contain one or more optional ingredients, e.g., known and conventional amounts of sensitizing agents, thickening agents, vulcanizing agents, surface active agents such as added carboxylate soaps, antioxidants, fire retardants such as aluminum trihydrate, metallic oxides such as zinc and cadmium oxides which facilitate gelation, and so forth.

The sealant-forming medium of this invention can be prepared in conventional equipment, e.g., any type of internal mixer or blender. The gaseous foaming agent, preferably air for reasons of economy and convenience, is dispersed in the filled latex employing known and conventional frothing equipment, usually as the sealant-forming medium is being applied to the desired site. The amount of gas introduced into the latex can vary considerably and ordinarily will be such as to provide a foamed sealant composition possessing a density of from about 0.1 to about 0.5 gm/cm$^3$.

The sealant composition is formed as a combined result of the gelling of the latex, its drying out and its vulcanization. The sealant-forming medium of this invention can be readily applied by trowel or similar means to the surface of the geological formation to be sealed with no special preparation required. The sealant is conveniently brought to the application site, e.g., a coal mine stopping, in a ready-to-use condition. One 3-gallon container or sealant is generally sufficient for an average sized ventilation stopping. The water based sealant-forming medium provides excellent coverage and seals against air or gas leaks after gelation and drying. The sealant composition adheres well to all types of surfaces normally encountered in underground workings, e.g., coal, stone, wood and steel.

Coating thicknesses on the order of from about 1 mm to about 15 mm are readily obtained. Foamed sealant coatings exhibit an excellent bridging capacity and are readily applied to the surface being treated. These coatings can span cracks on the underlying surface of as much as 12 mm.

A solid, i.e., non-porous, layer of film obtained from the foregoing sealant-forming medium (one containing no foaming or frothing component) is applied to the exposed surface of the foamed sealant composition so that upon drying of the gelled film, the sealant will possess a barrier coating which prevents or minimizes the leakage of gas through the foamed sealant and/or provides greater resistance to rupture of the underlying foam layer which might otherwise result were the mine stopping (or other geological formation) to shift or move. In general, an amount of unfrothed sealant-forming medium can be applied to provide a barrier coating thickness of from about 0.1 mm to about 1.5 mm.

The following examples are illustrative of the invention.

EXAMPLE 1

The following two-part sealant-forming medium was prepared.

| Part A | |
|---|---|
| Total Compound Wet Weight = | 4000 gm |
| Total Solids = | 79.6% |
| pH = | 10.9 |
| Viscosity 3/30 = | 1456 centipoises |
| Component | Dry Parts by Weight |
| BUTONAL TM NS 104[1] | 100.0 |
| potassium oleate, 20% | 3.0 |
| Trimene Base[2], 50% | 1.25 |
| Polycure 590[3], 60% | 5.9 |
| zinc oxide, 50% | 1.75 |
| alkali aluminum silicate (clay) filler | 100.0 |
| aluminum trihydrate | 25.0 |
| Total | 235.90 |
| Part B | |
| Ammonium Hydroxide (28% NH$_3$) | 1.2 |
| Gelling Agent[4] (69%) | 6.0 |

[1]BASF Corporation, a cold SBR latex of approximately 24 weight percent bound styrene and a solids content of 70.6 weight percent.
[2]Uniroyal Chemical Company, a secondary gelling agent.
[3]BASF Corporation, a composite vulcanizing package whose (dry) composition in parts by weight is as follows: 1.65 sulfur, 1.00 zinc diethyl dithiocarbamate, 1.00 zinc mercaptobenzothiazole, 1.25 zinc oxide and 1.00 antioxidant.
[4]Weight percent composition: 29.3 water, 10.7 monoethanolamine and 60.0 ammonium sulfamate.

Sealant-forming media were prepared by frothing 740 grams of Part A with ambient air to a volume of 3250 cc with a Hobart mixer. When volume was reached, Part B consisting of 10.7 grams of ammonium hydroxide and 21.6 grams of gelling agent were added and the foam refined for one minute. The wet foam was then spread on four Teflon boards at 3.0 mm thickness. A second quantity of foam was prepared in the same manner except that the four foams were spread at 6.0 mm thickness. The wet density of the foams at the time of spreading was 0.26 gm/cc in both cases. When dry, three of each of the foams prepared at 3.0 and 6.0 mm thickness were coated with unfoamed sealant-forming media prepared as follows:

To 500 grams of Part A were added 21.8 gm Part B under agitation for 1 minute. Films at wet thicknesses of 0.5, 1.0 and 1.5 mm spread on Teflon boards gelled in 8.5, 16 and 24 minutes, respectively.

The unfoamed sealant-forming media were applied to the foamed sealant compositions at nominal wet thicknesses of 0.5, 1.0 and 1.5 mm to provide gas impermeable barrier coatings on the exposed surfaces of the sealants. The gelation time at room temperature for each barrier coating was 7.4, 11 and 15 minutes, respectively. All of the films and foams described above were dried at room temperature without subsequent vulcanization at elevated temperature.

AIR PERMEABILITY TESTING

To test the foregoing unfoamed films and barrier layer-coated foamed sealant compositions, a 1 inch pipe union was modified by machining off the bevel of the male section of the union so as to provide two flat sealing surfaces. Circular test pieces of 4.0 cm diameter were cut from the samples and placed in the modified pipe union. The test pieces were backed by a circular piece of 40 mesh screen of the same diameter so as to prevent distortion of the test pieces when air pressure was applied. Any air that passed was collected in an inverted 100 cc graduate filled with water. In the case where barrier film coated sealant compositions were tested, the sample was placed in the apparatus so that the film side faced the supporting screen and the air impinged upon the foamed side of the sample.

TENSILE STRENGTH AND ELONGATION

The strength and elongation at break of the films and foams were evaluated by pulling 1.5 cm wide strips in an Instron at a head speed of 50 cm/min and an initial jaw separation of 6.0 cm. The data indicate that the addition of a thin film of unfoamed compound to the low density foam sealant as a barrier layer approximately triples the strength of the composite and increases its elongation from 26 to 50%.

ABRASION RESISTANCE

The resistance to abrasion of the films and foams was evaluated with a Taber Abraser Model 503 for one thousand cycles using two CS-10 abrasive wheels with a 250 gram load and with suction on to remove debris. In the case of film/foam combination, the film surface was abraded. In the case of the low density 3.0 mm foam, the sample was completely destroyed down to the surface of the specimen mounting card.

The data obtained as a result of the foregoing test procedures are as follows:

TEST RESULTS: FILMS, FOAMS AND COATED FOAMS

| Test Sample | Dry Thickness, mm | Weight gm/m$^2$ | Dry Density, gm/cc | Tensile Strength Kg/cm$^2$ | Elongation at Break, % | Abrasion Resistance, Taber Loss In 1000 Cycles grams | Air Permeability at 10 psi (Surface Area = 3.88 cm$^2$ |
|---|---|---|---|---|---|---|---|
| Film at 0.5 mm | 0.55 | 397 | 0.72 | | | 0.2004 | 100 cc air in 6 seconds |
| Film at 1.0 mm | 0.65 | 624 | 0.96 | | | 0.6845 | Nil cc air in 4 hours |
| Film at 1.5 mm | 1.00 | 991 | 0.99 | | | 0.6540 | Nil cc air in 19 hours |
| Foam at 3.0 mm | 2.00 | 593 | 0.30 | 0.77 | 200 | 2.2798 | 100 cc air in 1 second |
| + Film at 0.5 mm | 2.50 | 966 | 0.39 | 1.98 | 246 | 0.2672 | Nil cc air in 7 hours |
| + Film at 1.0 mm | 2.80 | 1430 | 0.51 | 2.76 | 306 | 0.4311 | Nil cc air in 24 hours |
| + Film at 1.5 mm | 3.36 | 2020 | 0.60 | 3.46 | 297 | 0.3945 | Nil cc air in 24 hours |
| Foam at 6.0 mm | 4.50 | 1219 | 0.27 | | | | |
| + Film at 0.5 mm | 4.83 | 1416 | 0.29 | | | | |
| + Film at 1.0 mm | 4.97 | 1756 | 0.39 | | | | |
| + Film at 1.5 mm | 5.38 | 2260 | 0.42 | | | | |

What is claimed is:

1. A gas barrier film-surfaced foamed sealant composition derived from a sealant-forming medium comprising an aqueous elastomeric latex binder, particulate filler, gelling agent and gaseous foaming agent dispersed therein, the composition being surfaced with a gas barrier film derived from a non-porous film-forming medium consisting essentially of an aqueous elastomer latex binder, particulate filler and gelling agent.

2. The gas barrier film-surfaced foamed sealant composition of claim 1 wherein the elastomeric latex binder is selected from the group consisting of natural rubber latex, styrene-butadiene latex, polychloroprene latex and butadiene-acrylonitrile latex.

3. The gas barrier film-surfaced foamed sealant composition of claim 1 wherein the elastomeric latex binder is a styrene-butadiene latex containing from about 20 to about 35 weight percent copolymerized styrene and a solids content of from about 65 to about 75 weight percent.

4. The gas barrier film-surfaced foamed sealant composition of claim 1 wherein the dry density of the foamed sealant-forming medium is from about 0.1 to about 0.5 gm/cm$^3$.

5. The gas barrier film-surfaced foamed sealant composition of claim 1 wherein the gelling agent is ammonium sulfamate.

6. The gas barrier film-surfaced foamed sealant composition of claim 1 wherein the foamed sealant-forming medium and/or non-porous film-forming medium further comprises one or more optional components selected from the group consisting of secondary gelling agent, vulcanization agent, flame retardant, added stabilizer, fiber reinforcement, antioxidant and surface active agent.

7. The gas barrier film-surfaced foamed sealant composition of claim 1 wherein the aqueous elastomeric latex binder, particulate filler and gelling agent are the same in both the sealant-forming medium and the non-porous film-forming medium.

8. The gas barrier film-surfaced foamed sealant composition of claim 1 wherein the thickness of the dried and gelled gas barrier film is from about 0.1 mm to about 1.5 mm.

* * * * *